United States Patent
Yajima et al.

(10) Patent No.: US 9,163,754 B2
(45) Date of Patent: Oct. 20, 2015

(54) RESIN-MADE FUEL INLET PIPE, AND METHOD FOR PRODUCING SAME

(71) Applicant: TOKAI RUBBER INDUSTRIES, LTD., Komaki-shi, Aichi-ken (JP)

(72) Inventors: Takashi Yajima, Komaki (JP); Koji Mizutani, Komaki (JP); Kazutaka Katayama, Komaki (JP); Shinya Nishikawa, Osaka (JP); Hiroshi Hayami, Osaka (JP)

(73) Assignee: SUMITOMO RIKO COMPANY LIMITED, Komaki-shi (JP)

(*) Notice: Subject to any disclaimer, the term of this patent is extended or adjusted under 35 U.S.C. 154(b) by 43 days.

(21) Appl. No.: 13/862,140

(22) Filed: Apr. 12, 2013

(65) Prior Publication Data

US 2013/0221001 A1    Aug. 29, 2013

Related U.S. Application Data

(63) Continuation of application No. PCT/JP2012/071652, filed on Aug. 28, 2012.

(30) Foreign Application Priority Data

Aug. 29, 2011   (JP) .................. 2011-185887
Feb. 28, 2012   (JP) .................. 2012-041714

(51) Int. Cl.
   *F16L 9/12*     (2006.01)
   *F16L 9/133*    (2006.01)
   (Continued)

(52) U.S. Cl.
   CPC ............ *F16L 9/133* (2013.01); *B29C 47/065* (2013.01); *B60K 15/013* (2013.01); *B60K 15/04* (2013.01);
   (Continued)

(58) Field of Classification Search
   CPC .......... F16L 9/12; F16L 9/125; F16L 9/127; F16L 9/133; F16L 9/14; Y10T 428/1372; Y10T 428/139; Y10T 428/1393; B29C 47/0023

USPC .................. 428/36.4, 36.9, 36.91
See application file for complete search history.

(56) References Cited

U.S. PATENT DOCUMENTS

| | | |
|---|---|---|
| 2003/0198768 A1 | 10/2003 | Delbarre |
| 2007/0012374 A1 | 1/2007 | Yasuda et al. |
| 2011/0186328 A1 | 8/2011 | Easter |

FOREIGN PATENT DOCUMENTS

| | | |
|---|---|---|
| JP | 62-91317 A | 4/1987 |
| JP | 10-30760 A | 2/1998 |

(Continued)

OTHER PUBLICATIONS

Office Action dated Jun. 17, 2014, issued in Corresponding Japanese Patent Application No. 2013-531321, with English Translation (5 pages).

(Continued)

*Primary Examiner* — Walter B Aughenbaugh
(74) *Attorney, Agent, or Firm* — Westerman, Hattori, Daniels & Adrian, LLP

(57) ABSTRACT

A resin-made fuel inlet pipe that has a light weight, excellent impact resistance, and causes no fuel leakage includes at least one resin layer comprising a resin composition containing (A) a high-density polyethylene (HDPE) or a linear short-chain branched polyethylene; (B) a polyethylene polymerized with a metallocene-based catalyst; and (C) a carbon black. A weight mixing ratio ((A)/(B)) is in a range of from 10/90 to 90/10; a content of component (C) is in a range of from 0.1 to 5 parts by weight with respect to 100 parts by weight of a total of components (A) and (B); a tissue (Y) comprising component (B) is inserted between linear crystalline tissues (X) comprising component (A) to expand an interval between the tissues (X); and component (C) is dispersed in the tissue (Y).

20 Claims, 3 Drawing Sheets

(51) Int. Cl.
  *F16L 11/11* (2006.01)
  *B60K 15/04* (2006.01)
  *B60K 15/01* (2006.01)
  *C08L 23/06* (2006.01)
  *B29C 47/06* (2006.01)
  *C08K 3/04* (2006.01)
  *B29C 47/00* (2006.01)

(52) U.S. Cl.
  CPC ............... *C08L 23/06* (2013.01); *F16L 11/11* (2013.01); *B29C 47/0011* (2013.01); *B29C 47/0023* (2013.01); *B60K 2015/047* (2013.01); *C08K 3/04* (2013.01); *C08L 2203/18* (2013.01); *C08L 2314/06* (2013.01); *Y10T 428/1372* (2015.01)

(56) References Cited

FOREIGN PATENT DOCUMENTS

| | | |
|---|---|---|
| JP | 11-019971 A | 1/1999 |
| JP | 11-48800 A | 2/1999 |
| JP | 2001-329179 A | 11/2001 |
| JP | 2004-35622 A | 2/2004 |
| JP | 2004-263119 A | 9/2004 |
| JP | 2005-15573 A | 1/2005 |
| JP | 2007-46772 A | 2/2007 |
| JP | 2008-55640 A | 3/2008 |
| WO | 2011/094055 A2 | 8/2011 |

OTHER PUBLICATIONS

International Search Report for PCT/JP2012/071652, mailing date of Dec. 4, 2012.

Notification of Transmittal of Translation of the International Preliminary Report on Patentabililty (Form PCT/IB/338) of International Application No. PCT/JP2012/071652 mailed Mar. 13, 2014 with Forms PCT/IB/373 and PCT/ISA/237 (8 pages).

Office Action dated Feb. 10, 2015, issued in corresponding Japanese Patent Application No. 2013-531321, with English translation (6 pages).

Supplemental European Search Report dated Apr. 2, 2015, issued in corresponding European application No. 12828380.1; in English (4 pages).

RESIN-MADE FUEL INLET PIPE, AND METHOD FOR PRODUCING SAME

RELATED APPLICATION

This application is a continuation of International Application No. PCT/JP2012/71652, filed on Aug. 28, 2012, which claims priority to Japanese Patent Application No. 2011-185887, filed on Aug. 29, 2011, and to Japanese Patent Application No. 2012-41714, filed on Feb. 28, 2012, the entire contents of each of which are hereby incorporated by reference.

BACKGROUND OF THE INVENTION

1. Field of the Invention

The present invention relates to a resin-made fuel inlet pipe to be used in a fuel transport pipe extending from a filer opening to a fuel tank in a vehicle such as an automobile and a method of producing the same, and more specifically, to a resin-made fuel inlet pipe formed by integrating a filler neck pipe, an inlet tube, and a filler hose, and a method of producing the same.

2. Description of the Related Art

Hitherto, from the viewpoint of collision safety (impact resistance), a metal pipe (inlet pipe) has been used on a fueling side of a fuel transport pipe extending from a filler opening to fuel tank in an automobile. A resin- or rubber-made filler hose is connected to the metal pipe, and the hose is attached to the fuel tank. In recent years, however, use of a resin-made hose in place of the metal pipe has been investigated to meet a demand for weight reduction of a pipe for an automobile.

As the resin-made hose described above, for example, a resin-made fuel filler tube for an automobile has been proposed (JP-A-HEI11-48800), which includes, as an inner layer of the fuel filler tube body, any one of a polyamide-based resin, ethylene vinyl alcohol, and an elastomer thereof, and as an outer layer thereof, a modified polyethylene resin, and the like.

SUMMARY OF THE INVENTION

However, the tube described in JP-A-HEI11-48800 has the following drawback. The occurrence of a crack in the inner layer at the time of collision causes a crack in the outer layer fused to the inner layer as well, with the result that fuel leaks to the outside. On the other hand, when an attempt is made to increase the thickness of the resin hose to provide the hose with impact resistance comparable to that of a metal pipe, its volume also increases owing to the increased thickness of the hose, which is contrary to the demand for weight reduction.

The pre sent invention has been made in view of such circumstances, and an object of the present invention is to provide a resin-made fuel inlet pipe that has a light weight, excellent impact resistance, and causes no fuel leakage, and a method of producing the pipe.

The inventors of the present invention have made extensive studies to obtain a resin-made fuel inlet pipe that has a light weight, excellent impact resistance, and causes no fuel leakage. During the studies, inventors have paid attention to the structure of a resin layer, and have obtained a fuel inlet provided with a structure including a high-density polyethylene (HDPE) or a linear short-chain branched polyethylene (LLDPE) (A) and a polyethylene polymerized with a metallocene-based catalyst (hereinafter sometimes referred to as "metallocene-based polyethylene") (B), in which a soft tissue (Y) formed of the component (B) is inserted between linear crystalline tissues (X) formed of the component (A) to expand an interval between the tissues (X). Then, as a result of continuous experiments, the inventors have found that a desired object can be achieved by producing a resin-made fuel inlet pipe having a structure in which the carbon black (C) is dispersed in the soft tissue (Y). Thus, the inventors have reached the present invention.

Thus, according to a first aspect of the present invention, a resin-made fuel inlet pipe includes at least one resin layer, the resin layer comprising a resin composition containing the following components (A) to (C): (A) a high-density polyethylene (HDPE) or a linear short-chain branched polyethylene (LLDPE); (B) a polyethylene polymerized with a metallocene-based catalyst; and (C) a carbon black, in which: a weight mixing ratio ((A)/(B)) between the component (A) and the component (B) falls within a range of from 10/90 to 90/10; a content of the component (C) falls within a range of from 0.1 to 5 parts by weight with respect to 100 parts by weight of a total of the component (A) and the component (B); a soft tissue (Y) comprising the component (B) is inserted between linear crystalline tissues (X) comprising the component (A) to expand an interval between the tissues (X); and the component (C) is dispersed in the soft tissue (Y).

Further, according to a second aspect of the present invention, a method of producing a resin-made fuel inlet pipe includes: adding the component (C) using a forced side feeder during a step of extruding the components (A) and (B); and extrusion molding the mixture, to hereby form the resin layer.

As in the embodiments described above, for example, a resin-made fuel inlet pipe of the present invention (hereinafter sometimes simply referred to as "fuel inlet pipe") can include a resin layer (hereinafter sometimes referred to as "high-speed deformable resin layer") having a structure in which a soft tissue (Y) formed of the component (B) is inserted between linear crystalline tissues (X) formed of the component (A) to expand an interval between the tissues (X). The exemplary fuel inlet pipe according to this embodiment of the preset invention brings together both of their characteristics, i.e., rigidity (strength) derived from the HDPE or LLDPE (A) and ductility (elongation) derived from the metallocene-based polyethylene (B) and is excellent in impact absorbing ability. In addition, the carbon black (C) is dispersed in the soft tissue (Y), and hence the strength improves in order to maintain elongation (high-speed tensile elongation) after a weather resistance test.

In addition, in the case where the carbon black (C) has a primary average particle diameter of from 10 to 100 nm, it is possible to maintain elongation and to improve weather resistance in addition to strength.

Further, when the interval between the linear crystalline tissues (X) is 30 to 500 nm, a good balance between the strength and impact resistance can be achieved.

In addition, when the resin composition for forming the resin layer contains an ionic liquid, the conductivity of the pipe improves, thus the pipe can be grounded even if the pipe tends to become charged at the time of fueling, and hence the safety of the pipe additionally improves.

In an actual use environment, the surface of the resin layer may be damaged by flying stones or the like to rupture the resin layer from the damaged portion. When a protective layer (which may be referred to as hard coat layer) having a predetermined thickness (for example, 0.2 to 0.8 mm) formed of a polyamide resin or the like is formed on the outermost periphery of the resin-made fuel inlet pipe of the present invention, a rupture of the resin layer due to the flying stones or the like can be prevented to improve chipping resistance.

In addition, when a resin-made fuel inlet pipe is produced, during a step of extruding the components (A) and (B), by adding the carbon black (C) using a forced side feeder and by extrusion molding the mixture, to thereby form the resin layer, the high-speed tensile elongation can be maintained because a predetermined amount of the carbon black (C) can be dispersed accurately in the soft tissue (Y).

DETAILED DESCRIPTION OF THE INVENTION

Next, an embodiment of the present invention is described in detail. However, the present invention is not limited to this embodiment.

The resin-made fuel inlet pipe of the present invention may have a construction including at least one resin layer (high-speed deformable resin layer).

Figure 1:
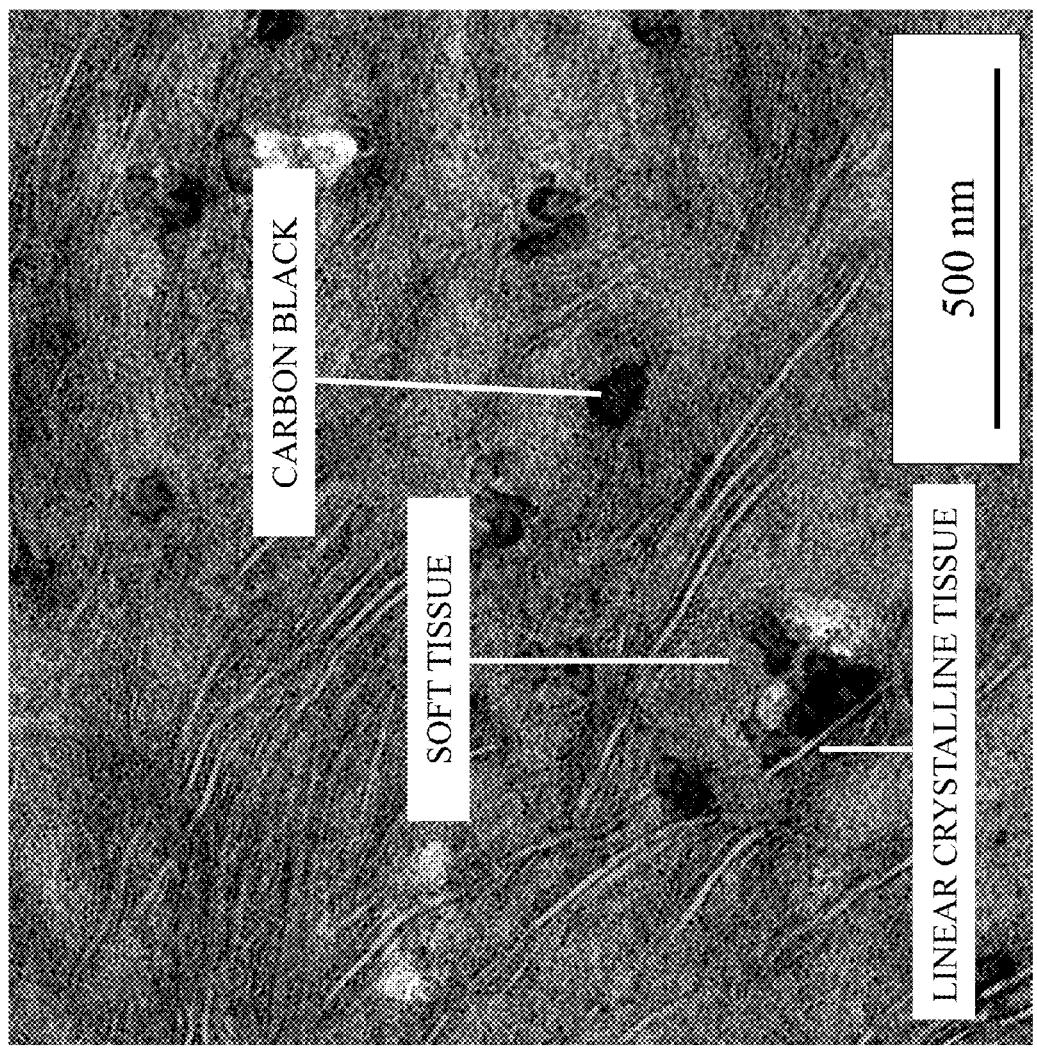
FIG. 1 is transmission electron micrograph showing an example of construction of resin layer of a resin-made fuel inlet pipe according to an embodiment of the present invention in which a soft tissue is inserted between linear crystalline tissues.

The most peculiar point of the resin layer in embodiments of the present invention is as follows. The resin layer has a structure in which the soft tissue (Y) formed of the component (B) is inserted between the linear crystalline tissues (X) formed of the component (A) to expand the interval between the tissues (X), and the carbon black (C) is dispersed in the soft tissue (Y). The transmission electron micrograph of FIG. 1 shows a construction of the resin layer in which the soft tissue is inserted between the linear crystalline tissues.

In at least some embodiments of the present invention, the phrase "has a structure in which the soft tissue (Y) formed of the component (B) is inserted between the linear crystalline tissues (X) formed of the component (A) to expand the interval between the tissues (X)" means that the resin layer may have a structure in which the soft tissue (Y) is inserted into any of intervals between the linear crystalline tissues (X), and it is not necessary that the soft tissue (Y) be inserted into all the intervals between the linear crystalline tissues (X).

The interval between the linear crystalline tissues (X) is preferably in a range of from 30 to 500 nm, particularly preferably 100 to 300 nm in terms of a balance between strength and impact resistance. When the interval between the linear crystalline tissues (X) is excessively small, the layer becomes too hard because the soft tissues (Y) formed of the component (B) is hardly inserted, thereby showing a tendency of poor impact resistance. When the interval between the linear crystalline tissues (X) is excessively large, the layer becomes too soft, thereby showing tendencies of poor strength and poor oil resistance because the ability of the component (A) is insufficiently exerted.

The interval between the linear crystalline tissues (can be measured by, for example, a transmission electron microscope. Next, a material for forming the resin layer (resin composition) is described.

<<High-Density Polyethylene or Linear Short-Chain Branched Polyethylene (A)>>

The high-density polyethylene (HDPE) has a specific gravity of preferably from 0.935 to 0.965, particularly preferably from 0.935 to 0.960.

It should be noted that the specific gravity is a value based on ISO 1183 (the same hereinafter).

In addition, the high-density polyethylene (HDPE) has a melt flow rate (MFR) of preferably HL from 1 to 55 g/10 min, more preferably HL from 10 to 1 g/10 min.

It should be noted that the MFR is measured in conformity with ASTM D 1238 (the same hereinafter).

The linear short-chain branched polyethylene (LLDPE) as a specific gravity of preferably from 0.915 to 0.945, particularly preferably from 0.920 to 0.94.

In addition, the linear short-chain branched polyethylene (LLDPE) has a melt flow rate (MFR) of preferably HL from 1 to 55 g/10 min, more preferably HL from 5 to 50 g/10 min.

<<Polyethylene Polymerized with Metallocene-Based Catalyst (B)>>

Examples of the polyethylene polymerized with a metallocene-based catalyst (metallocene-based polyethylene) (B) include a metallocene-based very low density polyethylene (VLDPE), a metallocene-based LLDPE, and a metallocene-based HDPE. Those may be used alone, or in combination of two or more kinds thereof. Of those, the metallocene-based VLDPE is preferred from the points of high impact resistance and flexibility.

The weight mixing ratio "(A)/(B)" between the components (A) and (B) falls within the range of from 10/90 to 90/10, preferably 70/30 to 90/10. When the mixing ratio of the component (A) is excessively small (the weight mixing ratio of the component (B) is excessively large), the composition becomes poor in strength and petrol resistance, and when the weight mixing ratio of the component (A) is excessively large (the weight mixing ratio of the component (B) is excessively small), the composition becomes poor in high-speed tensile elongation.

<<Carbon Black (C)>>

The carbon black (C) has a primary average particle diameter of preferably from 10 to 100 nm, particularly preferably from 20 to 70 nm from the points of strength ad dispersibility.

The content of the carbon black (C) falls within the range of from 0.1 to 5 parts by weight, preferably 0.5 to 4 parts by weight with respect to 100 parts by weight of the total of the components (A) and (B). When the content of the carbon black (C) is excessively small, the composition becomes poor in weather resistance, and when the content of the carbon black (C) is excessively large, elongation (high-speed tensile elongation) becomes small.

It should be noted that the resin composition for forming the resin layer may further include an ionic liquid, an antioxidant, an antioxidant, a pigment, a dye, a filler, a processing aid, or the like in addition to the components (A), (B), and (C).

As the ionic liquid, preferred ones include a cation of at least one of a six-membered ring compound, a five-membered ring compound, and an aliphatic-based compound, and an anion corresponding thereto, such as 1-ethyl-3-methylimidazolium tetrafluoroborate, 1-hexyl-3-methylimidazolium trifluoromethanesulfonate, 1-hexylpyridium chloride, or N,N,N-trimethyl-N-propylammonium bis(trifluoromethanesulfonyl)imide. Those may be used alone, or in combination of two or more kinds.

The ionic liquid can play the role of a plasticizer and is typically present in the soft tissue (Y) formed of the component (B). The ionic liquid can exert its conductivity when present in a small amount and it has little effect on hardness compared with the case of using the carbon black (C).

The content of ionic liquid is preferably 0.1 to 5 parts by weight, particularly preferably 0.1 to 1 part by weight with respect to 100 parts by weight of the total of the (A) and (B).

In some embodiments, a fuel inlet pipe according to the present invention may be produced, for example, as described below. That is, a twin-screw extruder equipped with a forced side feeder is prepared, and first, HDPE or LLDPE (A), the metallocene-based polyethylene (B), and optionally another additive or the like are molded by extrusion. During the process, a predetermined amount of carbon black (C) is added from the forced side feeder to produce pellets, and the pellets are molded by extrusion into a tubular shape, thereby obtaining the pipe. It should be noted that, if necessary, a bellows structure may be formed at the central portion of the tube with a corrugator or the like. In addition, the components may be molded directly by extrusion into the tubular shape without pelletization.

In some embodiments, a fuel inlet pipe according to the present invention may have a single-layer structure including only the specific resin layer or a multilayer structure including two or more layers including the specific resin layer and another resin layer. It should be noted that in the case of a multilayer structure including two or more layers, the specific resin layer is preferably arranged outside. In addition, in the case of a multilayer structure including two or more layers, the specific resin layer and the other resin layer are preferably in a substantially non-adherent state.

The term "non-adherent state" as used with respect to at least some embodiments of the present invention is not limited to a state in which the specific resin layer and the other resin layer do not adhere to each other at all, as long as the state is such that the resin layers adhere to each other at the time of impact such as collision, and is meant to include an adherent state such that the resin layers adhere to each other at a certain point as well.

Figure 2:
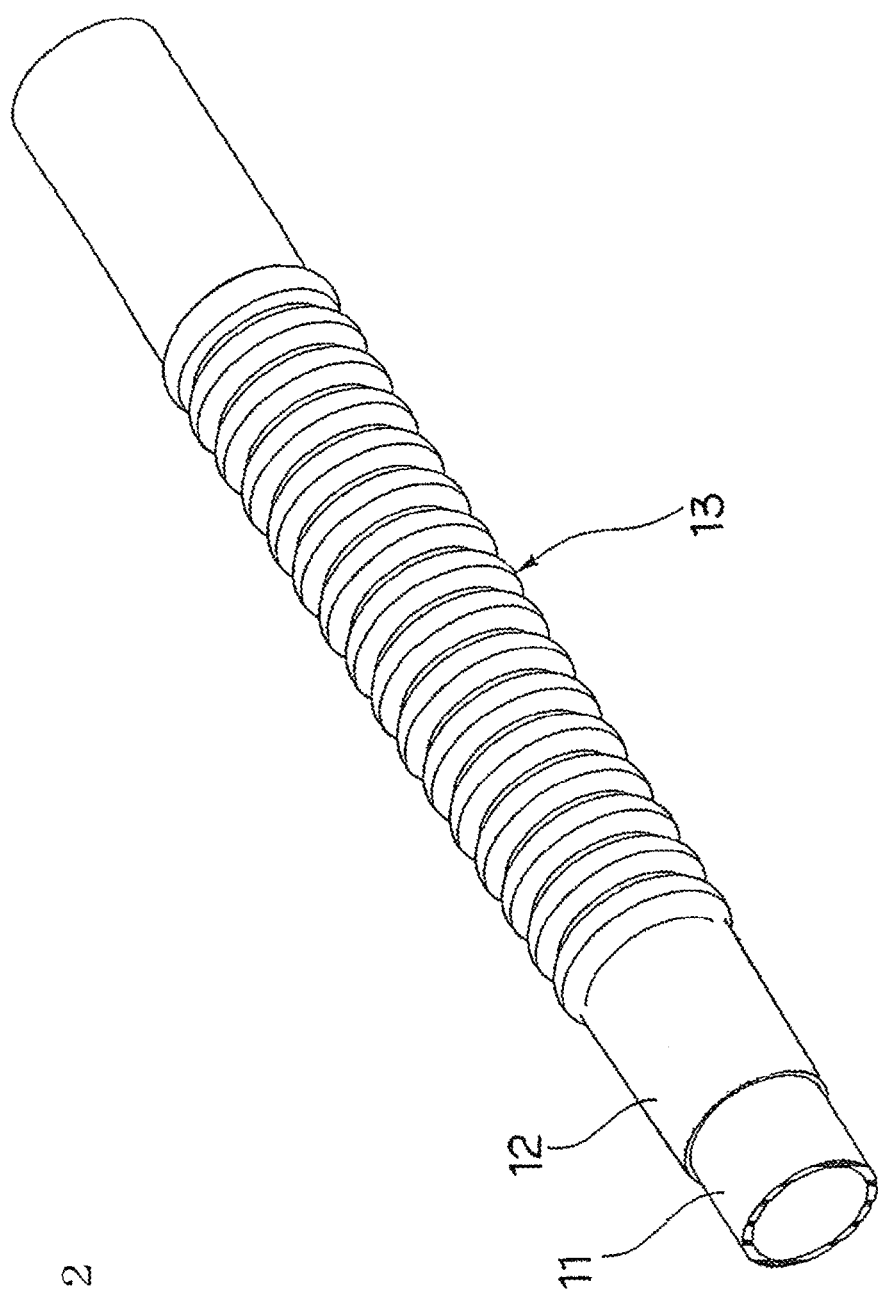
FIG. 2 is a construction view illustrating an example of a resin-made fuel inlet pipe according to an embodiment of the present invention.

For example, in some embodiments, a fuel inlet pipe according to the present invention can be formed by laminating an outer layer 12 on the outer peripheral surface of tubular inner layer 11 in a substantially non-adherent state, and its central portion is formed into a bellows portion 13 as illustrated in FIG. 2. In at least some embodiments the present invention, the outer layer 12 is preferably the specific resin layer.

<<Material for Inner Layer>>

As a material for the inner layer, a resin having fuel resistance, such as a polyamide resin, is preferred to promote an objective that the resin does not dissolve by a fuel, in addition, has such strength that the resin does not come out from an assembly portion, and is non-adhesive to HDPE and the like (A) in the outer layer (resin layer).

<Polyamide Resin>

As the polyamide resin, there are exemplified a polyamide 6 (PA6), a polyamide 46 (PA46), a polyamide 66 (PA66), a polyamide 92 (PA92), a polyamide 99 (PA99), a polyamide 610 (PA610), a polyamide 612 (PA612), a polyamide 1010 (PA1010), a polyamide 11 (PA11), a polyamide 912 (PA912), a polyamide 12 (PA12), a copolymer of a polyamide 6 and a polyamide 66 (PA6/66), a copolymer of a polyamide 6 and a polyamide 12 (PA6/12), an aromatic nylon, and the like. Those may be used alone, or in combination of two or more kinds. Of those, the polyamide 11 or the aromatic nylon is preferred because of being more excellent in low-fuel permeability and flexibility.

In some embodiments, the respective dimensions of a fuel inlet pipe according to the present invention are as described below.

The total thickness of the fuel inlet pipe in embodiments of the present invention falls preferably within the range of from 1.4 to 3.2 mm, particularly preferably within the range of from 1.8 to 3.2 mm.

In addition, as illustrated in FIG. 2 above, in some embodiments of a two-layer structure including the inner layer 11 and the outer layer 12, the thickness of the inner layer 11 fall within the range of typically from 1.0 to 1.8 mm, preferably within the range of from 1.0 to 1.8 mm, and the thickness of the outer layer 12 falls within the range of typically from 0.4 to 1.2 mm, preferably within the range of from 0.8 to 1.2 mm. It should be note, that in some embodiments, the thickness of the outer layer 12 falls within the range of from preferably 20 to 120%, particularly preferably within the range of from 40 to 120% with respect to the thickness of the inner layer 11.

The total length of the fuel inlet pipe of the present invention is not particularly limited because the pipe can be designed in accordance with the layout of an automobile, for example. Besides, the total length of bellows portion can also be determined in consideration of the absorption of tolerance and workability at the time of assembly.

It should be noted that in some embodiments of a resin-made fuel inlet pipe of the present invention, a single-layer or multilayer innermost layers may be formed on the inner peripheral surface of the pipe.

As materials for forming the innermost layer, a resin having fuel oil resistance against a fuel is preferred. For example, there are exemplified: flourine resins, such as a thermoplastic fluororesin (THV) formed of a terpolymer of vinylidene fluoride, hexafluoropropylene, and tetrafluoroethylene, an ethylene-tetrafluoroethylene copolymer (ETFE), and a polyvinylidene fluoride (PVDF); ethylene vinyl alcohol (EVOH); a polyphenylene sulfide (PPS); a polybutylene napthalate (PBN); a polybutylene terephthalate (PBT); a polyethylene (PE); and a modified polyethylene (modified PE). It should be noted that the material for the innermost layer may be the same material as the material for the inner layer (resin having fuel resistance such as a polyamide resin).

The thickness of the innermost layer may be selected within the range of typically from 0.05 to 0.5 mm, preferably from 0.1 to 0.4 mm.

Figure 3:
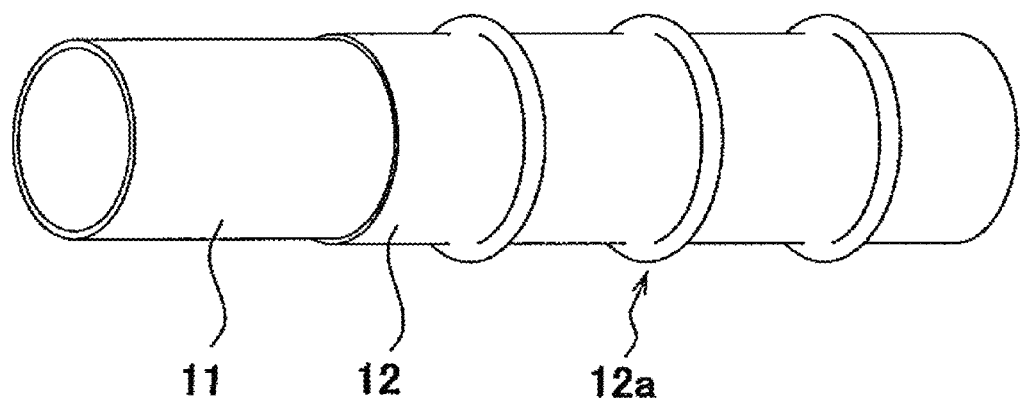
FIG. 3 is a construction view illustrating another example of the resin-made fuel inlet pipe according to an embodiment of the present invention.

It should be noted that some embodiments of a fuel inlet pipe of the present invention may have a plurality (typically 2 to 50, 3 in FIG. 3) ring-like protrusions (structure like the so-called bamboo joint) 12a extending along the peripheral direction (direction perpendicular to the longitudinal direction of the fuel inlet pipe) of the outer layer 12 at given intervals (typically at intervals of 5 to 50 mm) as illustrated in FIG. 3 from the viewpoint of improving impact resistance. The ring-like protrusions 12a are preferably made of the same material as that for the outer layer 12, and may be formed integrally with the outer layer 12 by, for example, a corrugator.

In some embodiments a fuel inlet pipe of the present invention, a protective layer (hard coat layer) may be formed on the outermost periphery. It should be noted that the resin layer and the protective layer are preferably in a substantially non-adherent state.

A material for forming the protective layer may include a polyamide resin and a polypropylene resin. Those may be used alone, or in combination of two or more kinds thereof. Of those, the polyamide resin is preferred in terms of chipping resistance.

As the polyamide resin, for example, there are exemplified a polyamide 6 (PA6), a polyamide 46 (PA46), a polyamide 6 (PA66), a polyamide 92 (PA92), a polyamide 99 (PA99), a polyamide 610 (PA610), a polyamide 612 (PA612), a polyamide 1010 (PA1010), a polyamide 11 (PA11), a polyamide 912 (PA912), a polyamide 12 (PA12), a copolymer of a polyamide 6 and a polyamide 66 (PA6/66, a copolymer of a polyamide 6 and a polyamide 12 (PA6/12), an aromatic nylon, and the like. Those may be used alone, or in combination of two or more kinds thereof. Of those, a PA is preferred because of its abrasion resistance.

It should be noted that a conductive polyamide resin having conductivity imparted by a conductive agent such as a carbon black may be used as the polyamide resin.

In some embodiments, the thickness of the protective layer preferably falls within the range of from 0.2 to 0.8 mm, particularly preferably within the range of from 0.2 to 0.5 mm.

A two-layer structure fuel inlet pipe produced by forming a protective layer on the outer peripheral surface of a resin layer can be produced as follows, for example. That is, a twin-screw extruder equipped with a forced side feeder is prepared, and first, HDPE or LLDPE (A), metallocene-based polyethylene (B), and optionally another additive and the like are molded by extrusion. During the process, a predetermined amount of carbon black (C) is added from the forced side feeder to produce pellets. Next, the pellets for forming the resin layer and a material for forming the protective layer (such as a polyamide resin) are co-extruded into a tubular shape. It should be noted that, if necessary, a bellows structure may be formed at the central portion of the tube with a corrugator or the like.

EXAMPLES

Next, Examples are described together with Comparative Examples. However, the present invention is not limited to these Examples. It should be noted that the term "part" means weight basis in the Examples.

First, the following materials for forming resin layers were prepared prior to carrying out examples and Comparative Examples.

<HDPE (A1)>
NOVATEC HD HE421 manufactured by Japan Polyethylene Corporation (specific weight: 0.96)
<LLDPE (A2)>
NOVATEC LL UH411 manufactured by Japan Polyethylene Corporation (specific weight: 0.92)
Metallocene-Based VLDPE (B)>
KERNEL KF261T manufactured by Japan Polyethylene Corporation (specific weight: 0.90)

<Carbon Black (C1)>
SEAST 9H manufactured by Tokai Carbon Co., Ltd. (primary average article diameter: 18 nm)
<Carbon Black (C2)>
SEAST SP manufactured by Tokai Carbon Co., Ltd. (primary average particle diameter: 95 cm)
<Ionic Solution>
N,N,N-Trimethyl-N-propylammonium bis(trifluoromethanesulfonyl)imide manufactured by KANTO CHEMICAL CO., INC.

Example 1

A twin-screw extruder equipped with a forced side feeder (TEX30α manufactured by The Japan Steel Works, LTD.) was prepared, and first, 90 parts of the HDPE (A1) and 10 parts of the metallocene-based VLDPE (B) were molded by extrusion. During the process, 2 parts of the carbon black (C1) were added from the forced side feeder to produce pellets. Next, a corrugator (manufactured by Colmar) was connected to a tube extruder (GT-40 manufactured by PLABOR Research Laboratory of Plastics Technology Co., Ltd), and a bellows structure was formed at the central portion of the tube. Thus, such a single-layer fuel inlet pipe having a central portion being formed into a bellows portion and both end portions each being formed into a straight portion was produced.

The fuel inlet pipe had an inner diameter 32 mm of the straight portion, an outer diameter 34.8 mm of the straight portion, a thickness 1.4 mm of the resin layer, an outer diameter 38 mm of the bellows portions, a total length of 150 mm, and a length 50 mm of the bellows portion.

Examples 2 to 8

Comparative Examples 1 to 5

Fuel inlet pipes were each produced in conformity with Example 1 except that the material for the resin layer was changed to any one of the combinations shown in Table 1 below.

Comparative Example 6

Blending in Example 3 was performed by dry blending, and the corrugator (manufactured by Colmar) was connected to the tube extruder (GT-40 manufactured by PLABOR Research Laboratory of Plastics Technology Co., Ltd), followed by directly forming a bellows structure at the central portion of the tube. Thus, such a single-layer structure fuel inlet pipe that the central portion was formed into a bellows portion and both end portions were each formed into a straight portion was produced.

TABLE 1

| | | (parts by weight) | | | | | | | | | | | | |
|---|---|---|---|---|---|---|---|---|---|---|---|---|---|---|
| | | Examples | | | | | | | | Comparative examples | | | | | |
| | | 1 | 2 | 3 | 4 | 5 | 6 | 7 | 8 | 1 | 2 | 3 | 4 | 5 | 6 |
| HDPE (A1) | | 90 | 70 | 70 | 70 | 10 | 70 | 70 | — | — | 100 | 70 | 70 | 70 | 70 |
| LLDPE (A2) | | — | — | — | — | — | — | — | 70 | — | — | — | — | — | — |
| Metallocene-based VLDPE (B) | | 10 | 30 | 30 | 30 | 90 | 30 | 30 | 30 | 100 | — | 30 | 30 | 30 | 30 |
| Carbon black (C1) | | 2 | 0.1 | 2 | 5 | 2 | — | 2 | 2 | — | — | — | 6 | — | 2 |
| Carbon black (C2) | | — | — | — | — | — | 2 | — | — | — | — | — | — | 6 | — |
| Ionic liquid | | — | — | — | — | — | — | 1 | — | — | — | — | — | — | — |
| In ordinary state | Elongation (%) | >300 | >300 | >300 | >300 | >300 | >300 | >300 | >300 | >300 | 250 | >300 | 250 | 250 | 150 |
| | Evaluation | ○ | ○ | ○ | ○ | ○ | ○ | ○ | ○ | ○ | x | ○ | x | x | x |
| | Yield | 27 | 26 | 27 | 30 | 10 | 27 | 25 | 11 | No | 30 | 20 | 30 | 20 | 20 |

TABLE 1-continued

| | | (parts by weight) | | | | | | | | | | | | |
|---|---|---|---|---|---|---|---|---|---|---|---|---|---|---|
| | | Examples | | | | | | | | Comparative examples | | | | |
| | | 1 | 2 | 3 | 4 | 5 | 6 | 7 | 8 | 1 | 2 | 3 | 4 | 5 | 6 |
| | strength (MPa) | | | | | | | | | yield point | | | | | |
| | Evaluation | ○ | ○ | ○ | ○ | ○ | ○ | ○ | ○ | | ○ | ○ | ○ | ○ | ○ |
| After weather resistance test | Elongation (%) | >300 | >300 | >300 | >300 | >300 | >300 | >300 | >300 | 250 | 150 | 250 | 150 | >300 | 150 |
| | Evaluation | ○ | ○ | ○ | ○ | ○ | ○ | ○ | ○ | x | x | x | x | ○ | x |
| Conductivity (volume resistivity) (Ω cm) | | 1 × 10$^{11}$ | 1 × 10$^{11}$ | 1 × 10$^{11}$ | 1 × 10$^{11}$ | 1 × 10$^{11}$ | 1 × 10$^{11}$ | 1 × 10$^{6}$ | 1 × 10$^{11}$ | 1 × 10$^{11}$ | 1 × 10$^{11}$ | 1 × 10$^{11}$ | 1 × 10$^{11}$ | 1 × 10$^{11}$ | 1 × 10$^{11}$ |
| Interval between linear crystalline tissues (X) (nm) | | 40 | 500 | 300 | 300 | 500 | 300 | 300 | 300 | — | 20 | 300 | 300 | 300 | 20 |

The products of the examples and the comparative examples thus obtained were evaluated for respective characteristics in accordance with the following criteria. Table 1 above shows those results together.

<High-Speed Tensile Elongation>

(In Ordinary State)

Elongation was measured by setting each fuel inlet pipe in a high-speed tensile tester (IM100 manufactured by IMATEK GmbH) and subjecting the pipe in ordinary state (20° C.) to a high-speed tensile test (13 m/s). Such a pipe having an elongation of 300% or more (>300) was evaluated as ○, and such a pipe having an elongation of less than 300% was evaluated as x.

In addition, yield strength (MPa) was determined in conformity with JIS K6922-1 and 2. Such a fuel inlet pipe having yield strength of 10 Mpa or more was evaluated as ○, and such a fuel inlet pipe having a yield strength of less than 10 Mpa was evaluated as x.

(After Weather Resistance Test)

Elongation was measured by setting each fuel inlet pipe into a high-speed tensile tester (IM100 manufactured by IMATEK GmbH) and subjecting the pipe to a high-speed tensile test (13 m/s) after weather resistance test. Such a pipe having an elongation of 300% or more (>300) was evaluated as ○, and such a pipe having an elongation of less than 300% was evaluated as x.

It should be noted that the weather resistance test was carried out under the following conditions.

The weather resistance test was carried out using a sunshine weather-ometer (300 SUNSHINE WEATHER METER S300 manufactured by Suga Test Instruments Co., Ltd.) as a xenon arc lamp weather resistance tester under conditions of 500-hr irradiation, xenon arc lamp (illuminance: 0.35 W/m$^2$ at 340 nm), watering: 13 min during 120-min irradiation, black panel temperature: 63±3° C.

<Conductivity (Volume Resistivity)>

A volume resistivity was measured in conformity with JIS K6271 by a double ring measurement method for measuring an electrical resistivity between circular electrodes. Measurement was carried out one minute after application of a voltage of 500 V between the electrodes.

<Interval Between Linear Crystalline Tissues (X)>

An interval between the linear crystalline tissues (X) was measured using a transmission electron microscope (HF-3300 manufactured by Hitachi High-Technologies Corporation).

As can be seen from the results of the table, each of the products of the examples was superior in elongation in ordinary state and after the weather resistance test and was excellent in impact resistance. Accordingly, it is assumed that no fuel leakage occurs even at the time of collision. It should be noted that the product of Example 7 containing the ionic liquid was excellent in conductivity.

The constructions of the products of all examples were observed by the transmission electron microscope (HF-3300 manufactured by Hitachi High-Technologies Corporation). As a result, the products of all examples were found to have a structure in which the soft tissue (Y) formed of the metallocene-based VLDPE (B) was inserted between the linear crystalline tissues (X) formed of the HDPE (A1) or the LLDPE (A2) to expand the linear crystalline tissues (X) and the carbon blacks (C1 and C2) were dispersed in the soft tissue (Y).

In contrast, the product of Comparative Example 1 was poor in elongation after the weather resistance test because the product was produced using the metallocene-based VLDPE (B) alone without using the HDPE (A1).

The product of Comparative Example 2 is poor in ordinary state and after the weather resistance test because the product includes the HDPE (A1) alone and does not include the metallocene-based VLDPE (B).

The product of Comparative Example 3 was poor in elongation after the weather resistance test because the product was produced without using the carbon blacks (C1 and C2).

The product of Comparative Example 4 was poor in elongation in ordinary state and after the weather resistance test because the product was produced using an excessive amount of the carbon black (C1).

The product of Comparative Example 5 was poor in elongation in ordinary state because the product was produced using an excessive amount of the carbon black (C2).

The product of Comparative Example 6 was produced by dry-blending and hence had small intervals between the linear crystalline tissues (X) formed of the HDPE (A1), and the soft tissue (Y) formed of the metallocene-based VLDPE (B) was not inserted between the linear crystalline tissues (X), in addition, it was considered that part of the carbon black was dispersed non-uniformly because the forced side feeder was not used. Therefore, the product of Comparative Example 6 was poor in elongation in ordinary state and after the weather resistance test.

Accordingly, it is assumed that all the products of Comparative Example 1 to 4 and 6 are poor in impact resistance and cause a crack in a hose at the time of collision, with the result that fuel leakage occurs.

Example 9

A two-layer structure fuel inlet pipe produced by forming a protective layer on the outer peripheral surface of a resin layer was produced. First, pellets for forming the resin layer were produced in the same manner as in Example 3. That is, the twin-screw extruder equipped with the forced side feeder (TEX30α manufactured by The Japan Steel Works, LTD.) was prepared, and first, 70 parts of the HDPE (A1) and 30 parts of the metallocene-based VLDPE (B) were molded by extrusion. During the process, 2 parts of the carbon black (C1) was added from the forced side feeder to produce pellets. Next, the corrugator (manufactured by Colmar was connected to the tube extruder (GT-40 manufactured by PLABOR Research Laboratory of Plastics Technology Co, Ltd), and a bellows structure was formed at the central portion of the tube by co-extruding the pellets for forming the resin layer and a polyamide 11 for forming the protective layer (RILSAN BESN BK P212CTL (specific gravity: 1.04) manufactured by Arkema) into a tubular shape. Thus, such two-layer structure fuel inlet pipe that the central portion was formed into the bellows portion and both end portions were each formed into a straight portion was produced. It should be noted that the resin layer and the protective layer were in a non-adherent state.

The fuel inlet pipe had the following dimensions. The inner diameter of the straight portion was 32 mm, the outer diameter of the straight portion was 34.8 mm, the thickness of the resin layer was 1.4 mm, the thickness of the protective layer was 0.2 mm, the outer diameter of the bellows portion was 38 mm, the total length was 150 mm, and the length of the bellows portion was 50 mm.

Example 10

A two-layer structure fuel inlet pipe that the central portion was formed into a bellows portion and both end portions were each formed into a straight portion was produced in conformity with Example 9 except that a conductive polyamide 11 (conductive PA11) (RILSAN BESN BK P212CTL (specific gravity: 1.16) manufactured by Arkema) was used instead of the polyamide 11 for forming the protective layer.

The two-layer structure fuel inlet pipes (the products of Examples 9 and 10) produced by forming the protective layer and the single-layer structure fuel inlet pipe (the product of Example 3) produced by forming no protective layer were evaluated on chipping resistance in accordance with the following criteria.

<Chipping Resistance>

A shipping test was carried out in accordance with a description of ASTM D 3170. That is, the fuel inlet pipes were evaluated on chipping resistance by blowing 500 g of powder stone #6 (stone size: 13 to 5 mm) at an atmosphere temperature of −40° C. from a distance of 300 mm at a discharge pressure of 480 kPa and a blowing angle of 90°.

The results of the chipping test show that the two-layer structure fuel inlet pipes produced by forming the protective layer (the products of Examples 9 and 10) have little possibility of a rupture of the resin layer caused by flying stones of the like and are excellent in chipping resistance compared with the single-layer structure fuel inlet pipe produced by forming no protective layer (the product of Example 3).

It should be noted that specific forms in the present invention have been shown in examples above, but it is to be understood that such examples are purely illustrative and are not to be interpreted as limiting. Various modification apparent to those skilled in the art are intended to be within the scope of this invention.

Although specific forms of embodiments of the instant invention have been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention The fuel inlet pipe of the present invention can be used for the fuel transport pipe extending from the filler opening to the fuel tank in the vehicle such as an automobile, e.g., a filler neck pipe, an inlet tube, a filler hose, or a breather tube. However, it is preferred to use for a neck-integrated fuel inlet pipe formed by integrating the filer neck pipe, the inlet tube, and the filler hose.

What is claimed is:

1. A resin-made fuel inlet pipe comprising at least one resin layer, the resin layer comprising a resin composition containing the following components (A) to (C):
   (A) a high-density polyethylene (HDPE) or a linear short-chain branched polyethylene;
   (B) a polyethylene polymerized with a metallocene-based catalyst; and
   (C) a carbon black, wherein:
   a weight mixing ratio ((A)/(B)) between the component (A) and the component (B) falls within a range of from 10/90 to 90/10;
   a content of the component (C) falls within a range of from 0.1 to 5 parts by weight with respect to 100 parts by weight of a total of the component (A) and the component (B);
   a tissue (Y) comprising the component (B) is inserted between linear crystalline tissues (X) comprising the component (A) to expand an interval between the tissues (X); and
   the component (C) is dispersed in the tissue (Y).

2. A resin-made fuel inlet pipe according to claim 1, wherein the carbon black (C) has a primary average particle diameter in a range of from 10 to 100 nm.

3. A resin-made fuel inlet pipe according to claim 1 wherein the interval between the linear crystalline tissues (X) is in a range of 30 to 500 nm.

4. A resin-made fuel inlet pipe according to claim 1, wherein the resin layer comprises the resin composition further containing an ionic liquid.

5. A resin-made fuel inlet pipe according to claim 1, wherein the resin-made fuel inlet pipe comprises a protective layer on an outermost periphery of the pipe.

6. A resin-made fuel inlet pipe according to claim 5, wherein the protective layer comprises at least one of a polyamide resin and a polypropylene resin.

7. A resin-made fuel inlet pipe according to claim 5, wherein the protective layer has a thickness of from 0.2 to 0.8 mm.

8. A resin-made fuel inlet pipe according to claim 1, wherein the high-density polyethylene (HDPE) has a specific gravity of from 0.935 to 0.965.

9. A resin-made fuel inlet pipe according to claim 1, wherein the high-density polyethylene (HDPE) has a melt flow rate (MFR) in a range of from high load (HL) 1 to 55 g/10 min.

10. A resin-made fuel inlet pipe according to claim 1, wherein the linear short-chain branched polyethylene has a specific gravity in a range of from 0.915 to 0.945.

11. A resin-made fuel inlet pipe according to claim 1, wherein the linear short-chain branched polyethylene has a melt flow rate (MFR) in a range of from high load (HL) 1 to 55 g/10 min.

12. A resin-made fuel inlet pipe according to claim 1, wherein the polyethylene polymerized with the metallocene-based catalyst (B) comprises at least one selected from the group consisting of a metallocene-based very low density polyethylene (VLDPE), a metallocene-based linear short-chain branched polyethylene, and a metallocene-based high-density polyethylene (HDPE).

13. A resin-made fuel inlet pipe according to claim 4, wherein the ionic liquid comprises at least one selected from the group consisting of 1-ethyl-3-methylimidazolium tetrafluoroborate, 1-hexyl-3-methylimidazolium trifluoromethanesulfonate, 1-hexylpyridium chloride, and N,N,N-trimethyl-N-propylammonium bis(trifluoromethanesulfonyl)imide.

14. A resin-made fuel inlet pipe according to claim 4, wherein a content of the ionic liquid is in a range of from 0.1 to 5 parts by weight for 100 parts by weight of a total of the components (A) and (B).

15. A resin-made fuel inlet pipe according to claim 1, wherein the resin-made fuel inlet pipe has a multilayer structure comprising two or more layers including the resin layer and another layer of a resin composition that is different from the resin composition of the layer, and wherein the resin layer and the another resin layer are laminated in a non-adherent state.

16. A resin-made fuel inlet pipe according to claim 1, wherein the resin-made fuel inlet pipe has a multilayer structure comprising two or more layers including the resin layer and another layer of a resin composition that is different from the resin composition of the layer, and wherein the resin-made fuel inlet pipe comprises the resin layer as an outer layer and a polyamide resin layer as an inner layer.

17. A resin-made fuel inlet pipe according to claim 1, wherein the resin-made fuel inlet pipe comprises an innermost layer comprising at least one selected from the group consisting of a thermoplastic fluorine resin (THV) formed of a terpolymer of vinylidene fluoride, hexafluoropropylene, and tetrafluoroethylene, an ethylene-tetrafluoroethylene copolymer (ETFE), a polyvinylidene fluoride (PVDF), ethylene vinyl alcohol (EVOH), a polyphenylene sulfide (PPS), a polybutylene naphthalate (PBN), a polybutylene terephthalate (PBT), a polyethylene (PE), and a modified polyethylene (modified PE).

18. A method of producing the resin-made fuel inlet pipe of claim 1, comprising:
  adding the component (C) using a forced side feeder during a step of extruding the components (A) and (B); and
  extrusion molding the mixture, to thereby form the resin layer.

19. A method of producing the resin-made fuel inlet pipe according to claim 18, comprising:
  extruding the components (A) to (C) by an extruder to produce pellets; and
  extrusion molding the pellets into a tubular shape, to thereby form the resin layer.

20. A method of producing the resin-made fuel inlet pipe according to claim 18, comprising extrusion molding the components (A) to (C) directly into a tubular shape, to thereby form the resin layer.

* * * * *